Nov. 14, 1950   L. T. ASKREN   2,529,896

SHUTTER FOR MOTION-PICTURE APPARATUS

Filed Nov. 8, 1947

LEE T. ASKREN
INVENTOR

BY
ATTORNEYS

UNITED STATES PATENT OFFICE 2,529,896

SHUTTER FOR MOTION-PICTURE APPARATUS

Lee T. Askren, Rochester, N. Y., assignor to Eastman Kodak Company, Rochester, N. Y., a corporation of New Jersey Application November 8, 1947, Serial No. 784,905

5 Claims. (Cl. 88—19.3)

This application relates to photographic apparatus and particularly to shutters for such apparatus. Motion picture cameras and projectors usually employ shutters which interrupt a light beam many times a second, usually 16 or 24 frames per second, although, of course, this number may vary according to the particular use of the apparatus. One object of my invention is to provide a shutter which will be extremely precise and constant in angular velocity and which will, therefore, chop the light beam at exactly the required time. Another object of my invention is to provide a shutter mechanism in which the shutter blade may iron out fluctuations in the angular velocity of the mechanism, such as may be due to imperfect gear teeth, eccentricities, and irregularities in the driving mechanism and changes in velocity in the driving motor. Another object of my invention is to materially reduce mechanical noises, such as always result from fixedly coupling a shutter to the rotor of a motor with or without intermediate gearing. Other objects will appear from the following specification, the novel features being particularly pointed out in the claims at the end thereof.

Coming now to the drawings wherein like reference characters denote like parts throughout:

Figure 1:
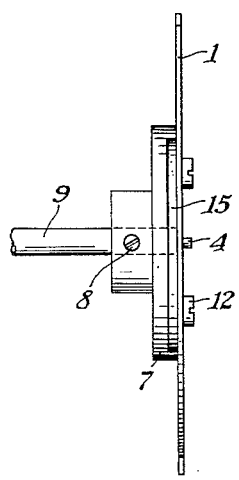
Fig. 1 is a side elevation of a shutter and its driving shaft constructed in accordance with and embodying a preferred form of my invention.
Figure 2:
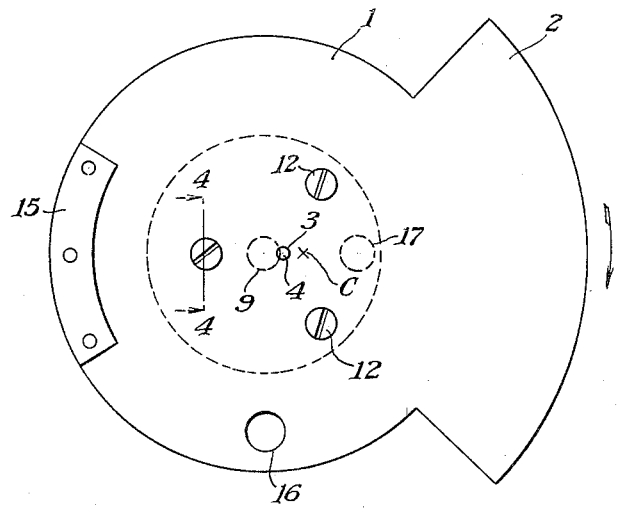
Fig. 2 is a front elevation of the shutter and driving shaft shown in Fig. 1.

In motion picture apparatus in use for the standard type of black-and-white and color photography, the need for extreme precision in the angular velocity of shutters has not been a material factor because it is a comparatively simple matter to keep the timing of a shutter sufficiently accurate to give the required exposure in a camera and to cover the moving film in a projector. However, with such motion picture apparatus, noise (particularly gear noise) is and always has been very disturbing.

Television has introduced an entirely new factor in requiring the highest degree of precision in the angular velocity of a shutter. Television cameras may take pictures at a rate of 24 a second where the pictures may be scanned and presented at 30 a second on known types of fluorescent screens or cathode tubes. Consequently, it may be desirable to take, at a single exposure of a shutter, one frame and one-half a frame at one exposure and at the next exposure one-half a frame and one frame. Unless the two half-frame exposures are exceedingly precise in the time that the shutter passes the exposure aperture, "banding" will result. That is, there will be dark lines or streaks extending across the center part of the two half pictures. This, of course, is highly undesirable.

Motion picture apparatus, both projectors and cameras, almost always contain gearing for operating a shutter and this gearing, even where extremely accurate gears are employed, produces noise due primarily to slight changes in angular velocities of the rotating parts. Such noise is particularly annoying in sound apparatus and much work has been done in an effort to insulate against noise. Even where gearing may be reduced to a minimum, or omitted, such as may occur in apparatus employing synchronous motors, the "hunting" of the motor for its normal speed causes irregularities, even though slight, in the angular velocity of the rotating parts.

Where a relatively large moment of inertia is directly coupled to the rotor of a motor, such irregularities in velocities cause undesirable gear noise. A very material reduction in this noise can be made by utilizing my improved invention in which the shutter is not directly coupled to the driving mechanism.

My improved form of shutter de-couples the moment of inertia from a system when operating at running speeds and except when starting and stopping. I mount my shutter so as to be movable relative to the driving system to a limited extent which may be determined by pins and slots. At normal running speeds, the pins do not engage the ends of the slots and fluctuations in the shaft velocity permit the shutter to maintain its angular velocity, thereby running ahead of its drive shaft when the shaft velocity is reduced and retaining its normal angular velocity, and running behind the shaft velocity when the shaft speed increases. Thus, the comparatively slight fluctuations in the driving system are not immediately transmitted to the shutter and, in fact, with a reasonably good driving system they are not transmitted to the shutter at all when operating at normal speeds. Of course, when the system is started and stopped and when the pins reach the ends of the slot, the shutter is then, in effect, coupled to the driving system, but this is not important if the shutter can be de-coupled during its useful speed of operation.

Figure 3:
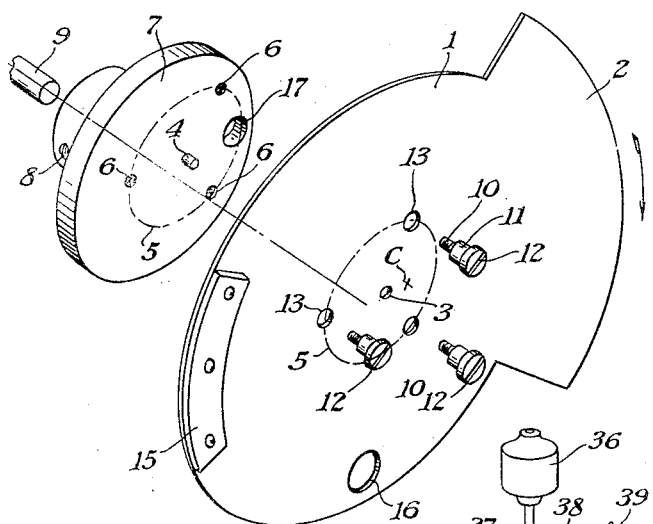
Fig. 3 is a perspective exploded view showing the several parts of the shutter shown in the preceding figures in separated positions.

More specifically, my improved shutter may take the form shown in the accompanying drawing wherein the shutter 1 may include a flange 2 adapted to intercept a light beam; this shutter 1 having a bearing 3 on which the shutter may turn on an eccentric pin 4. As best shown in Fig. 3, the eccentric pin 4 lies in the center of a circle 5 on which a plurality of threaded apertures 6 are spaced apart. The pin 4 and the apertures 6 are carried by the hub 7 which may be attached, as by means of a set screw 8, to a mechanism-driven shaft 9.

Figure 4:
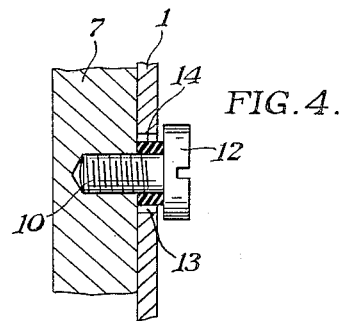
Fig. 4 is an enlarged fragmentary detail on line 4—4 of Fig. 2.

In order to limit the movement of the shutter 1 about the eccentric pin 4, there are three screws 10 having shoulders 11 and slotted heads 12; the shoulders 11 passing through apertures 13 in the shutter 1. These screws are threaded into the tapped holes 6. As indicated in Fig. 4, if desired, the shoulders on the screws may be made of resilient material, such as rubber, leather, or the like, and there is a normal clearance between the outside of the shoulder 14 and the aperture 13 so that the shutter 1 is permitted limited movement with respect to its support. While this movement should be calculated for the particular size shutter and the use to which it is to be placed, as a typical example, the slot 13 should provide for about $\frac{1}{16}$ of an inch freedom of movement at the aperture on a shutter of 3-inch radius. This is merely by way of example and may vary considerably under various different conditions.

The shutter 1 is carefully counterbalanced; there being a weight 15, in the form illustrated, lying directly opposite the flange 2 and the shutter being arranged so that the center of gravity C of the shutter 1 lies radially of the pivot 4 and beyond the pivot 4 and away from the shaft 9, as indicated in the drawings.

If desired, instead of a rubber or leather sleeve 14 for the screw 10, a spring-metal washer may be employed. A non-resilient or integral metal shoulder may be satisfactory.

In addition to counterbalancing the shutter with the weight 15, I have provided a windage balance hole 16 to further assist in keeping the shutter in its most desirable position and it is also desirable to balance the disk 7 as by one or more holes 17, as shown.

The average position of the shutter relative to the shaft is determined by the location of the pivot pin 4. Since the center of gravity C of the blade lies beyond the pivot pin, a normal acceleration of the center of gravity will tend to hold it in line with the pin 4 and the center of rotation of the shaft 9. The moment of inertia of the blade and the location of the pivot pin and center of gravity of the blade are proportioned to give a low, natural frequency of vibration of the shutter about the pin when running a few cycles per second. The reason for the windage balance hole 16 is that it is necessary to move the center of gravity of the blade slightly behind the line through the center of rotation and the pivot 4 to provide a small moment to counteract the drag caused by windage.

Figure 5:
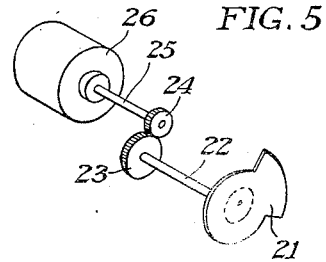
Figs. 5 and 6 are diagrammatic illustrations showing two different forms of shutter-driving mechanism in which a shaft, connected to the rotor of a motor, is geared to a shutter blade.
Figure 6:
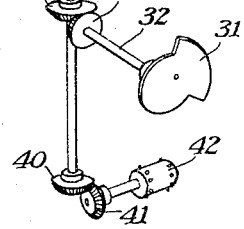

Figs. 5 and 6 diagrammatically illustrate possible connections between a prime mover and the shutter blade. In Fig. 5 the shutter blade 21 may be driven by a shaft 22 through gears 23 and 24 from a shaft 25 connected to the rotor of a motor 26. In Fig. 6 the shutter blade 31 may be driven by a shaft 32 connected through beveled gears 33 and 34 to a shaft 35, this shaft being turned by the rotor of a motor 36. In addition, beveled gears 37 and 38 may turn a sprocket 39 and beveled gears 40 and 41 may turn a sprocket 42.

In both of the typical diagrammatically-shown driving systems, gears are employed and slightly imperfect teeth will cause momentary fluctuations in the velocities of shafts 22 and 32 driving the shutter blades 21 and 31, particularly when there are fluctuations in the speed of the rotor of the motor. If these shutters should be directly coupled to the shafts, these changes in velocities would result in considerable noise, as well as result in fluctuations in the angular velocity of the shutters themselves. Both of these results are very undesirable. Where the motion picture apparatus is used for photographing television scanning screens, fluctuations in angular velocity cannot produce good results, as pointed out above.

By de-coupling the shutter at its normal running speed from the driving system, the fluctuations in angular velocity of the drive shaft are not transmitted to the shutter blades and, consequently, precise chopping of the light beam can be obtained, as well as a material reduction in the amount of noise, because, when the shutter blade drive shaft angular velocity increases momentarily, the shutter blade tends to maintain its constant speed running behind the angular velocity of the shaft and if the fluctuation should decrease the angular velocity of the shaft, the angular velocity of the shutter blade runs ahead of the shaft, tending to maintain its precise angular velocity. It is, of course, apparent that if these fluctuations exceed a given amount, the shutter becomes coupled to the driving system, in effect, since the pin and slot become definitely engaged. This is what happens when the mechanism starts and stops, but this is not particularly important in cameras, since it is customary to waste a certain amount of film each time the camera is started and, in projectors, because there is always a leader strip in advance of the first pictures to be projected.

I have found that with a shutter constructed as shown in the illustrated example that a well-made mechanism will drive the shutter blade through its working range of speed so precisely that the light beam, passing through the two half exposure frames, is accurately chopped so that no banding whatever occurs and, in addition, the gear noise is very materially reduced. In fact, the noise is reduced to such an extent that my improved form of shutter is extremely desirable for both cameras and projectors which are used for ordinary black-and-white and color photography, as distinguished from those which are of primary interest for television work.

Having thus described my invention what I desire to secure by Letters Patent of the United States and what I claim is:

1. A shutter mechanism for motion picture apparatus comprising a driven shaft adapted to have variations in its angular velocity during normal running speed, means for movably mounting the shutter on the shaft including an eccentrically positioned pivot carried by and rotatable with the shaft and on which the shutter may turn relative to the shaft, coactive means carried by the shutter and the shaft for limiting movement of the shutter relative to the shaft upon the pivot, said coactive means comprising a plurality of pins passing through a plurality of apertures, the apertures being materially larger than the pins and normally lying out of contact with the pins under normal running conditions but being movable relative to the pins as the speed of the shutter shaft varies relative to the speed of the shutter, the center of gravity of the shutter lying further from the shaft than from the eccentric pivot whereby variations from a normal running angular velocity of the driven shaft may not be immediately transmitted to the shutter to change the angular velocity of the shutter.

2. A shutter mechanism for motion picture apparatus comprising a driven shaft, a pivot eccentrically carried thereby, a shutter pivotally mounted to turn on the pivot, means for limiting the turning movement of the shutter on the pivot, said shutter being balanced and having a center of gravity radially offset from the pivot whereby variations in angular speeds of the driven shaft at substantially operating speed will not be transmitted to the shutter.

3. A shutter mechanism for motion picture apparatus comprising a driven shaft, a pivot eccentrically carried thereby, a shutter pivotally mounted on the pivot to turn thereon, means for limiting the turning movement of the shutter on the pivot comprising pin-and-slot connections, said shutter being balanced and having a center of gravity radially offset from the pivot, whereby rotative movement of the shutter may be received by the shutter from the driven shaft through the eccentric pivot, said pin-and-slot connections being symmetrically positioned about the eccentric pivot.

4. The shutter mechanism set forth in claim 3 characterized by the pins including resilient sleeves positioned to contact with the slots when said shutter is in one position with respect to the shaft.

5. The shutter mechanism defined in claim 3 characterized by the shutter including a windage perforation positioned to move the center of gravity of the shutter slightly behind a line drawn through the center of rotation of the shaft and the eccentric pivot.

LEE T. ASKREN.

REFERENCES CITED

The following references are of record in the file of this patent:

UNITED STATES PATENTS

| Number | Name | Date |
|---|---|---|
| 905,910 | Naylor | Dec. 8, 1908 |
| 1,067,750 | Niles | July 15, 1913 |
| 1,885,631 | Sapier | Nov. 1, 1932 |
| 1,894,769 | Hoffmann | Jan. 17, 1933 |